May 29, 1934.  W. STRELOW  1,960,801
DIAPHRAGM GAS METER
Filed May 1, 1931
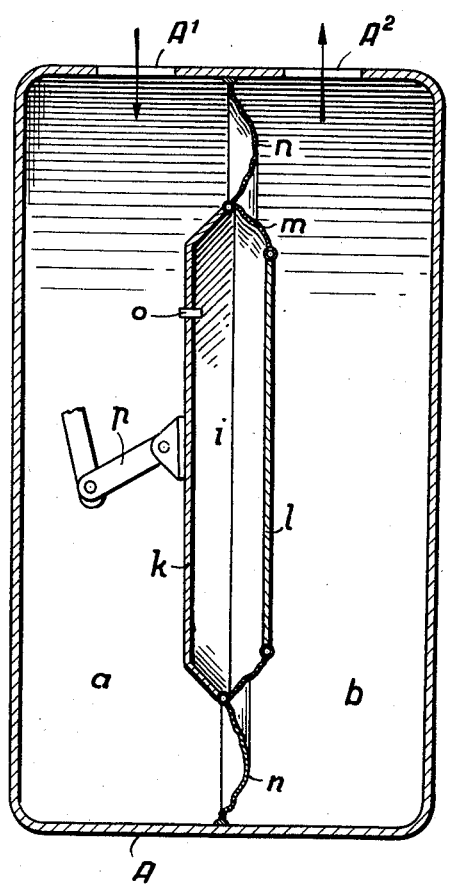
Inventor:
Wilhelm Strelow
by Dr Koch
attorney Patented May 29, 1934

1,960,801

UNITED STATES PATENT OFFICE 1,960,801

DIAPHRAGM GAS METER

Wilhelm Strelow, Berlin-Zehlendorf-West, Germany, assignor to Allgemeine Elektricitats-Gesellschaft, Berlin, Germany Application May 1, 1931, Serial No. 534,301
In Germany May 9, 1930

1 Claim. (Cl. 73—1)

This invention relates to an improved construction of diaphragm gas meters, having means to obviate or remove the measuring faults caused by the use of the diaphragm in said meters. These diaphragms suffer, as is known, from the disturbing property that their amplitude becomes greater if they are subjected to a larger load and the number of revolutions or of the strokes becomes larger, so that the measuring chambers become larger and take up more gas than at a small load or a smaller number of revolutions or strokes, in consequence whereof too little is measured at larger loads and too much at smaller ones.

To obviate this drawback it has already been proposed to provide, in connection with the main measuring chambers, bounded by the diaphragm, an auxiliary measuring chamber bounded by a diaphragm of its own, which communicates, with one of the main measuring chambers. This communication is effected by an aperture that throttles the gas current and permits the filling and the emptying of said auxiliary chamber or chambers only within a certain period of time, in consequence whereof at a larger load and a greater number of strokes the period of time available for the individual strokes will not be sufficient for a complete emptying of the said auxiliary chamber, whereby, in turn, the further consequence is entailed that the gas remaining in this chamber is not also withdrawn, and the increase of the amount of gas which the main chambers receive, will be compensated by the suppression of a corresponding amount of gas which is retained in the auxiliary chamber. According to the present invention the auxiliary chamber is formed by a single raised plate being the centre part of the main diaphragm, an auxiliary diaphragm attached to one side of said plate and a second rigid plate forming the centre part of said auxiliary diaphragm.

The invention is illustrated diagrammatically and by way of example on the accompanying drawing showing an axial section through a main measuring chamber combined with an auxiliary measuring chamber.

Referring to the drawing, A denotes that part of a gas meter in which the diaphragm is enclosed and which is connected in known manner with the other parts of the meter. The gas enters and discharges from the measuring chambers through the openings $A^1$ and $A^2$ which are controlled in known manner by known means that I have omitted as they do not form parts of this invention. The diaphragm $n$ divides the measuring space into two chambers $a$ and $b$, and its centre portion is formed by a rigid plate $k$.

The manner of operation of the gas meter is such that when the gas is streaming into the measuring chamber $a$ through the opening $A^1$ the diaphragm is expanded, and during this time the gas present in the measuring chamber $b$ is driven out through the opening $A^2$. This being finished, the diaphragm swings to the other side, and now the chamber $b$ is filled and the chamber $a$ emptied, and so on successively. The means for moving the diaphragm to the one and the other side, and the means for transmitting the movements of the diaphragm to the counting mechanism are also known and I abstain therefore, from showing and describing also them.

When the gas meter is subjected to a strong load and the oscillations of the diaphragm $n$ from its middle position into the two extreme positions take place very quickly, the amplitudes of the diaphragm become larger, owing to the expansions of the waves thereof, than is in proper correspondence with the actual amounts of gas, and there, thus, measuring faults and indication faults arise.

Now, there is provided, according to the present invention, an auxiliary diaphragm $m$, which is attached to the plate $k$ of the main diaphragm and a second rigid plate 1 forming the centre part of said auxiliary diaphragm. The two plates and the auxiliary diaphragm form together an auxiliary measuring chamber $i$ which is in communication with the measuring chamber $a$ through a small piece of tube $o$ inserted into the plate $k$, the size of which is such that complete filling and complete emptying of the chamber $i$ requires a certain definite period of time. Supposing, the space constituting the chamber $i$ be equal to 0.5 liter and the size of the aperture $o$ be such that the filling of the chamber $i$ with gas requires 3 seconds. Supposing, further, that the space constituting the chamber $a$, or the chamber $b$ respectively, be equal to 2.5 liters then, if the meter is subjected to a load up to 3 cubic metres per hour, then every stroke of the diaphragm will require about 3 seconds. Therefore, up to that load of the maximum of 3 cubic metres per hour, the auxiliary chamber $i$ would be completely filled and completely emptied at every stroke of the diaphragm $n$.

If now, the load to which the gas meter is subjected is increased, say, up to 6 cubic metres per hour, the period of time of one stroke of the diaphragm amounts only to 1.5 seconds, and with 9 cubic metres per hour that time lasts even only 1 second, so that the auxiliary chamber will be filled and emptied only for one half or even one third of its capacity. This lacking amount compensates the surplus resulting therefrom that with an increasing load of the meter with the increasing number of strokes thereby caused the amplitude of the main diaphragm is also and unduly increased whereby the faulty measurements and indications are caused, as already stated. This is now completely obviated.

$n$ and $m$ may be integral. $p$ is one of the (known) members by which motion of the diaphragm is transmitted by the intermediary of the plate $k$.

I claim:—

A diaphragm gas meter, comprising, in combination, a plurality of main measuring chambers, a main diaphragm separating the main measuring chambers and forming one wall of same, a single rigid plate forming the centre part of said main diaphragm, an auxiliary diaphragm attached to one side of said plate, and a second rigid plate forming the centre part of said auxiliary diaphragm, said auxiliary diaphragm forming together with said rigid plates an auxiliary measuring chamber, said auxiliary chamber having a throttling aperture communicating with one of the main chambers.

WILHELM STRELOW.